US011412529B2

(12) United States Patent
Li et al.

(10) Patent No.: US 11,412,529 B2
(45) Date of Patent: Aug. 9, 2022

(54) DETERMINING A TRANSMISSION SCHEME (71) Applicant: Lenovo (Beijing) Limited, Beijing (CN)

(72) Inventors: Hongchao Li, Beijing (CN); Lingling Xiao, Beijing (CN); Lianhai Wu, Beijing (CN); Hongmei Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 198 days.

(21) Appl. No.: 16/754,918

(22) PCT Filed: Oct. 10, 2017

(86) PCT No.: PCT/CN2017/105530
§ 371 (c)(1),
(2) Date: Apr. 9, 2020

(87) PCT Pub. No.: WO2019/071430
PCT Pub. Date: Apr. 18, 2019

(65) Prior Publication Data
US 2020/0322973 A1  Oct. 8, 2020

(51) Int. Cl.
*H04W 4/00* (2018.01)
*H04W 72/12* (2009.01)
(Continued)

(52) U.S. Cl.
CPC ....... *H04W 72/1268* (2013.01); *H04L 5/0055* (2013.01); *H04W 72/0446* (2013.01); *H04W 72/1257* (2013.01); *H04W 72/14* (2013.01)

(58) Field of Classification Search
None
See application file for complete search history.

(56) References Cited

U.S. PATENT DOCUMENTS 5,920,701 A * 7/1999 Miller ..................... H04L 47/29
   709/228
9,781,744 B1  10/2017 Tenny et al.
(Continued)

FOREIGN PATENT DOCUMENTS

CN   106788943 A      5/2017
WO   2011/025426 A1   3/2011
WO   2017/128104 A1   8/2017

OTHER PUBLICATIONS

Lenovo, Motorola Mobility, "Discussion of procedures for UL transmission with and without grant", 3GPP TSG RAN WG1 Meeting #89 R1-1707766, May 15-19, 2017, pp. 1-4.
(Continued)

*Primary Examiner* — Phirin Sam
(74) *Attorney, Agent, or Firm* — Kunzler Bean & Adamson (57) ABSTRACT

Apparatuses, methods, and systems are disclosed for determining a transmission scheme. One method (400) includes receiving (402) data at a buffer at a first time. The method (400) also includes determining (404) a transmission scheme for transmitting the data based on whether a second time corresponding to a scheduling request resource or a third time corresponding to a grant-free resource is closer in time to the first time. The method (400) includes transmitting (406) the data using the transmission scheme.

20 Claims, 5 Drawing Sheets

(51) Int. Cl.
*H04L 5/00* (2006.01)
*H04W 72/04* (2009.01)
*H04W 72/14* (2009.01)

(56) References Cited

U.S. PATENT DOCUMENTS

| | | | |
|---|---|---|---|
| 10,727,981 B2* | 7/2020 | Gao | H04L 5/0055 |
| 2014/0050090 A1* | 2/2014 | Nordstrom | H04W 72/1247 |
| | | | 370/232 |
| 2014/0295865 A1* | 10/2014 | Fantaye | H04W 52/0216 |
| | | | 455/450 |
| 2017/0332358 A1* | 11/2017 | Park | H04W 72/1289 |
| 2018/0309496 A1* | 10/2018 | Lee | H04B 7/086 |
| 2018/0375636 A1* | 12/2018 | You | H04W 74/0808 |
| 2019/0075584 A1* | 3/2019 | Li | H04L 5/0055 |
| 2020/0296749 A1* | 9/2020 | Freda | H04L 47/286 |

OTHER PUBLICATIONS

Lenovo, Motorola Mobility, "On UL transmission procedures to reduce latency and enhance reliability", 3GPP TSG RAN WG1 #90bis R1-1717859, Oct. 9-13, 2017, pp. 1-4.

Ericsson, "Uplink Dynamic Scheduling in NR", 3GPP TSG-RAN WG2 #96 Tdoc R2-168669, Nov. 14-18, 2016, pp. 1-4.

International Application No. PCT/CN2017/105530, "Notification of Transmittal of the International Search Report and the Written Opinion of the International Searching Authority, or the Declaration" dated Jun. 29, 2018, pp. 1-9.

Huawei, Hisilicon, "HARQ design for UL URLLC", 3GPP TSG RAN WG1 Meeting #87 R1-1611658, Nov. 14-18, 2016, pp. 1-7.

* cited by examiner

DETERMINING A TRANSMISSION SCHEME

FIELD

The subject matter disclosed herein relates generally to wireless communications and more particularly relates to determining a transmission scheme.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Medium Access Control ("MAC"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Resource Element ("RE"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, data may be transmitted using scheduled and/or unscheduled resources. In such networks, there may be scheduled and unscheduled resources available for transmission.

BRIEF SUMMARY

Methods for determining a transmission scheme are disclosed. Apparatuses and systems also perform the functions of the method. In one embodiment, the method includes receiving data at a buffer at a first time. In certain embodiments, the method includes determining a transmission scheme for transmitting the data based on whether a second time corresponding to a scheduling request resource or a third time corresponding to a grant-free resource is closer in time to the first time. In some embodiments, the method includes transmitting the data using the transmission scheme.

In one embodiment, the transmission scheme includes transmitting a scheduling request using the scheduling request resource in response to the second time being closer in time to the first time than the third time. In a further embodiment, the transmission scheme includes transmitting at least part of the data using the grant-free resource after transmitting the scheduling request, and the grant-free resource is a next available grant-free resource after the second time and within a timing window for receiving an uplink grant. In certain embodiments, the transmission scheme includes inhibiting transmission of the data using the grant-free resource after transmitting the scheduling request, and the grant-free resource is a next available grant-free resource after the second time and within a timing window for receiving an uplink grant. In various embodiments, the transmission scheme includes transmitting at least part of the data using the grant-free resource after transmitting the scheduling request, and the grant-free resource is a next available grant-free resource after the second time and outside a timing window for receiving an uplink grant. In some embodiments, the transmission scheme includes inhibiting transmission of the data using the grant-free resource after transmitting the scheduling request in response to receiving an uplink grant before the grant-free resource, and the grant-free resource is a next available grant-free resource after the second time and within a timing window for receiving the uplink grant.

In certain embodiments, the transmission scheme includes inhibiting transmission of the data using the grant-free resource after transmitting the scheduling request in response to receiving an uplink grant before the grant-free resource, and the grant-free resource is a next available grant-free resource after the second time and outside a timing window for receiving the uplink grant. In some embodiments, the transmission scheme includes transmitting at least part of the data using the grant-free resource after transmitting the scheduling request in response to receiving an uplink grant before the grant-free resource and a scheduled transmission corresponding to the uplink grant being after the grant-free resource.

In various embodiments, the transmission scheme includes transmitting at least part of the data using the grant-free request resource in response to the third time being closer in time to the first time than the second time. In certain embodiments, the transmission scheme includes transmitting a scheduling request using the scheduling request resource after transmitting the at least part of the data and in response to the scheduling request resource being before receipt of feedback corresponding to the transmission of the at least part of the data, and the scheduling request resource is a next available scheduling request resource. In some embodiments, the transmission scheme includes inhibiting transmission of a scheduling request using the scheduling request resource after transmitting the at least part of the data and in response to the scheduling request resource being before receipt of feedback corresponding to the transmission of the at least part of the data, and the scheduling request resource is a next available scheduling request resource.

In certain embodiments, the transmission scheme includes transmitting a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource. In various embodiments, the transmission scheme includes inhibiting transmission of a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource. In some embodiments, the transmission scheme includes transmitting a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource.

In various embodiments, the transmission scheme includes inhibiting transmission of a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource. In some embodiments, the transmission scheme includes inhibiting transmission of a scheduling request using the scheduling request resource after transmitting the at least part of the data and in response to receiving an uplink grant, and the scheduling request resource is a next available scheduling request resource. In certain embodiments, the transmission scheme includes transmitting a scheduling request using the scheduling request resource after transmitting the at least part of the data and in response to not receiving feedback and not receiving an uplink grant, and the scheduling request resource is a next available scheduling request resource.

In one embodiment, the transmission scheme includes transmitting a scheduling request using the scheduling request resource and transmitting at least part of the data using the grant-free request resource. In some embodiments, the method includes mapping scheduling requests and grant-free transmissions to different logical channels with different traffic types.

An apparatus for determining a transmission scheme, in one embodiment, includes a memory that receives data at a buffer at a first time. In various embodiments, the apparatus includes a processor that determines a transmission scheme for transmitting the data based on whether a second time corresponding to a scheduling request resource or a third time corresponding to a grant-free resource is closer in time to the first time. In some embodiments, the apparatus includes a transmitter that transmits the data using the transmission scheme.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
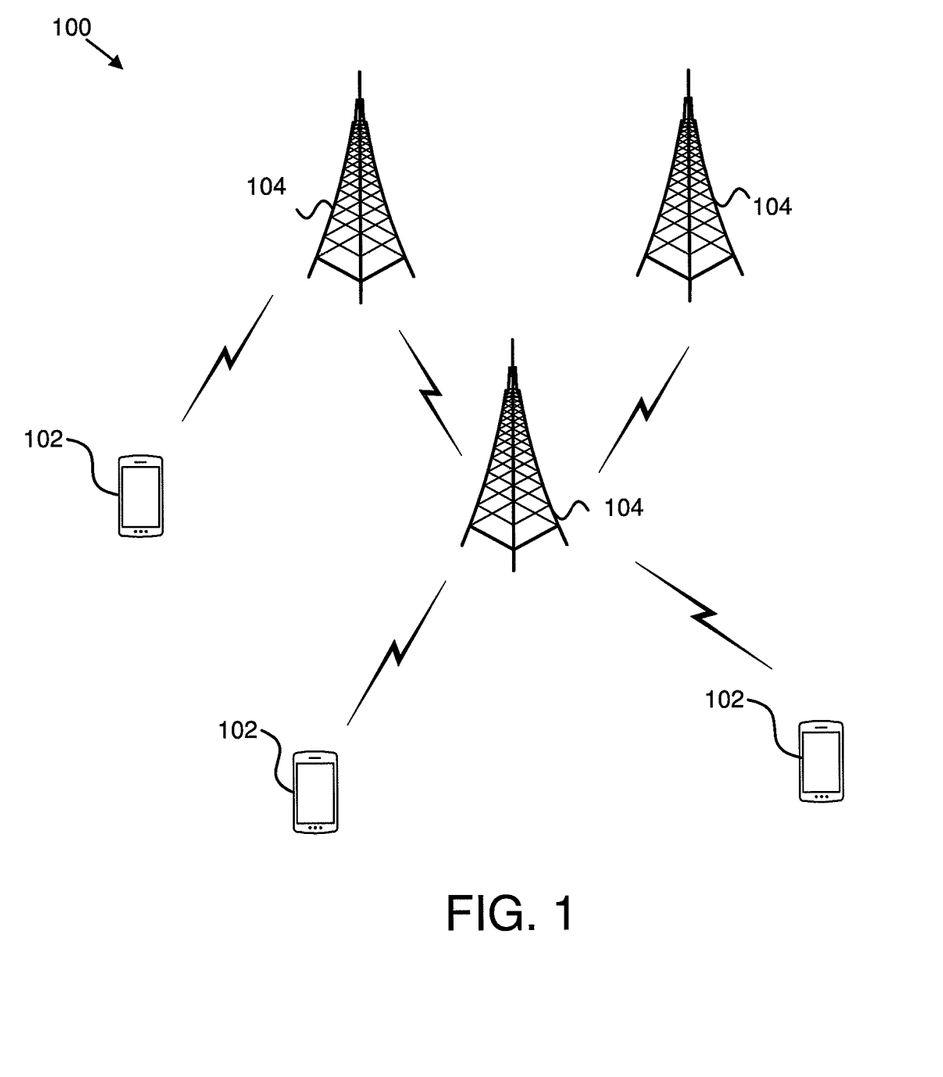
FIG. 1 is a schematic block diagram illustrating one embodiment of a wireless communication system for determining a transmission scheme.

FIG. 1 depicts an embodiment of a wireless communication system 100 for determining a transmission scheme. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive data at a buffer at a first time. In certain embodiments, the remote unit 102 may determine a transmission scheme for transmitting the data based on whether a second time corresponding to a scheduling request resource or a third time corresponding to a grant-free resource is closer in time to the first time. In some embodiments, remote unit 102 may transmit the data using the transmission scheme. Accordingly, a remote unit 102 may be used for determining a transmission scheme. In certain embodiments, a base unit 104 may receive data from the remote unit 102 based on the transmission scheme.

Figure 2:
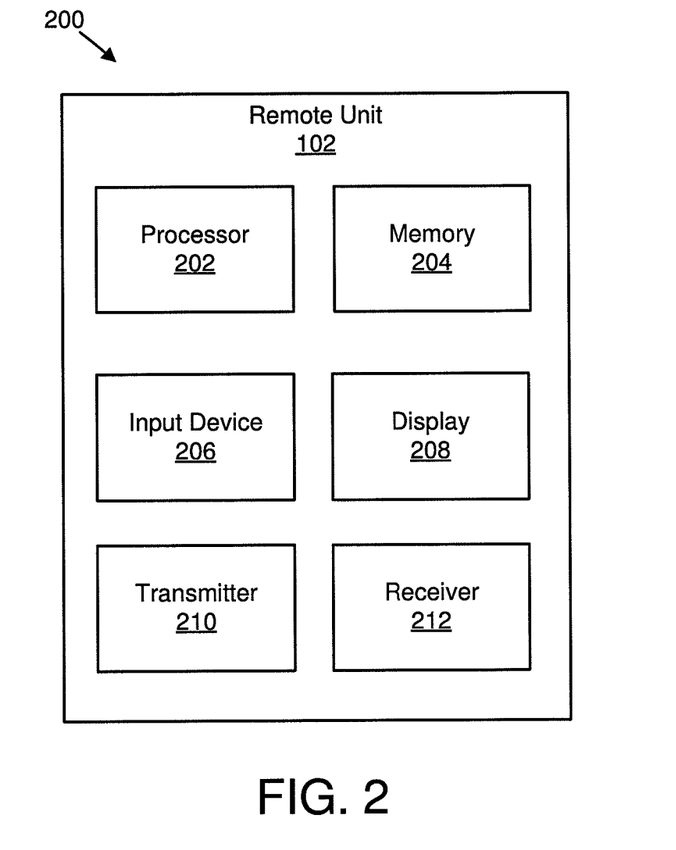
FIG. 2 is a schematic block diagram illustrating one embodiment of an apparatus that may be used for determining a transmission scheme.

FIG. 2 depicts one embodiment of an apparatus 200 that may be used for determining a transmission scheme. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a transmission scheme for transmitting data based on whether a second time corresponding to a scheduling request resource or a third time corresponding to a grant-free resource is closer in time to a first time at which data is received at a buffer. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102. In one embodiment, the memory 204 receives data at a buffer at a first time.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 may be used to transmit data using a transmission scheme. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In some embodiments, the remote unit 102 may be configured with one or more scheduling request resources and one or more grant-free transmission resources (e.g., grant-free resources). In such embodiments, multiple scheduling request configurations may be used (e.g., with one-bit for each). Moreover, one or multiple scheduling request configurations may be mapped to one logical channel.

Furthermore, in such embodiments, type 1 and type 2 grant-free transmission may be used. In type 1 grant-free transmission, all of the parameters may be RRC configured such that no L1 activation is used. In type 2 grant-free transmission, it may be similar to semi-persistent scheduling ("SPS") because time domain resources may be RRC configured and frequency domain resources may be L1 configured. Accordingly, L1 activation and/or deactivation may be used. In addition, multiple configurations (e.g., time and/or frequency domain resources, a MCS level, repetition times, HARQ-ACK related configurations, etc.) for grant-free transmission may be supported. By having the remove unit 102 configured with one or more scheduling request resources and one or more grant-free transmission resources, latency may be reduced, ambiguity between a remote unit 102 and a base unit 104 may be reduced, and/or unnecessary transmission of scheduling requests or grant-free may be avoided thereby reducing interference and/or collisions.

In certain embodiments, if a remote unit 102 is configured with both scheduling request resources and also grant-free transmission resources (e.g., type 1—resources are RRC-configured and there is no need to activate via DCI and/or type 2—resources are RRC-configured and need to activate via DCI), various remote unit 102 behaviors may be specified by configuration (e.g., L1, L2, L3, DCI, MAC CE, RRC, etc.) and/or predetermined (e.g., fixing in a specification).

In one embodiment, if data arrives at a remote unit 102 buffer, the remote unit 102 may use a transmission scheme that includes transmitting a scheduling request in a scheduling request resource instance first because the configured scheduling request resource instance is closer in time than a grant-free resource. In such an embodiment, one or more of the following may be included as part of the transmission scheme: the remote unit 102 may be enabled to transmit data using a configured grant-free resource in a next closest grant-free resource instance (e.g., the next grant-free resource in time after the scheduling request resource instance used to transmit the scheduling request) within a timing window for receiving an UL grant from a base unit 104; the remote unit 102 may be blocked (e.g., inhibited, not enabled) from transmitting data using a configured grant-free resource in the next closest grant-free resource instance within the timing window for receiving the UL grant from the base unit 104; the remote unit 102 may be enabled to transmit data using a configured grant-free resource in the next closest grant-free resource instance outside the timing window (e.g., after the timing window) for receiving the UL grant from the base unit 104; the remote unit may be blocked from transmitting data even if there is a configured grant-free resource within the timing window for receiving the UL grant from the base unit 104, if an UL grant is received before the instance of the grant-free resource; the remote unit 102 is blocked from transmitting data even if there is a configured grant-free resource in outside the timing window for receiving the UL grant from the base unit 104, if an UL grant is received before the instance of the grant-free resource; and/or the remote unit 102 is enabled to transmit data using a configured grant-free resource in the next closest grant-free resource instance, if an UL grant is already received before that instance, and if the scheduled transmission (e.g., based on the scheduling request) is after the next closest grant-free resource instance, regardless of whether the next closest grant-free resource instance is within or outside the timing window for receiving the UL grant from the base unit 104.

In another embodiment, if data arrives at a remote unit 102 buffer, the remote unit 102 may use a transmission scheme that includes transmitting data in a grant-free manner first because the configured grant-free transmission resource instance is closer in time than a scheduling request resource. In such an embodiment, one or more of the following may be included as part of the transmission scheme: the remote unit may be enabled to transmit a scheduling request using a configured scheduling request resource in a next closest scheduling request instance before the remote unit 102 receives a HARQ-ACK (e.g., feedback) corresponding to the grant-free transmission; the remote unit 102 is blocked from transmitting a scheduling request using a configured scheduling request resource in the next closest scheduling request instance before the remote unit 102 receives a HARQ-ACK corresponding to the grant-free transmission; the remote unit is enabled to transmit a scheduling request using a configured scheduling request resource in the next closest scheduling request instance after the remote unit 102 receives a positive acknowledge (e.g., ACK) corresponding to the grant-free transmission; the remote unit 102 is blocked from transmitting a scheduling request using a configured scheduling request resource in the next closest scheduling request instance after the remote unit 102 receives a positive acknowledge corresponding to the grant-free transmission; the remote unit 102 is enabled to transmit a scheduling request using a configured scheduling request resource in the next closest scheduling request instance after the remote unit 102 receives a negative acknowledge (e.g., NACK) corresponding to the grant-free transmission; the remote unit 102 is blocked from transmitting a scheduling request using a configured scheduling request resource in the next closest scheduling request instance after the remote unit receives a negative acknowledge corresponding to the grant-free transmission; the remote unit 102 is blocked from transmitting a scheduling request using a configured scheduling request resource in the next closest scheduling request instance after the remote unit 102 receives an UL grant from the base unit 104; and/or the remote unit is enabled to transmit a scheduling request using a configured scheduling request resource in the next closest scheduling request instance if the remote unit 102 does not receive a HARQ-ACK and does not receive an UL grant from the base unit 104.

In a further embodiment, if data arrives at a remote unit 102 buffer, the remote unit 102 may use a transmission scheme that includes transmitting both grant-free data and a scheduling request concurrently (e.g., simultaneously, together, with an overlapping time, etc.). In such an embodiment, due to the transmission duration of the scheduling request and the grant-free data potentially being different, such transmissions may partially and/or entirely overlap. Furthermore, in such embodiments, one or more of the following may be included as part of the transmission scheme: the remote unit 102 may be enabled to transmit data using a configured grant-free resource in a next closest grant-free resource instance (e.g., the next grant-free resource in time after the scheduling request resource instance used to transmit the scheduling request) within a timing window for receiving an UL grant from a base unit 104; the remote unit 102 may be blocked (e.g., inhibited, not enabled) from transmitting data using a configured grant-free resource in the next closest grant-free resource instance within the timing window for receiving the UL grant from the base unit 104; the remote unit 102 may be enabled to transmit data using a configured grant-free resource in the next closest grant-free resource instance outside the timing window (e.g., after the timing window) for receiving the UL grant from the base unit 104; the remote unit may be blocked from transmitting data even if there is a configured grant-free resource within the timing window for receiving the UL grant from the base unit 104, if an UL grant is received before the instance of the grant-free resource; the remote unit 102 is blocked from transmitting data even if there is a configured grant-free resource in outside the timing window for receiving the UL grant from the base unit 104, if an UL grant is received before the instance of the grant-free resource; the remote unit 102 is enabled to transmit data using a configured grant-free resource in the next closest grant-free resource instance, if an UL grant is already received before that instance, and if the scheduled transmission (e.g., based on the scheduling request) is after the next closest grant-free resource instance, regardless of whether the next closest grant-free resource instance is within or outside the timing window for receiving the UL grant from the base unit 104; the remote unit may be enabled to transmit a scheduling request using a configured scheduling request resource in a next closest scheduling request instance before the remote unit 102 receives a HARQ-ACK corresponding to the grant-free transmission; the remote unit 102 is blocked from transmitting a scheduling request using a configured scheduling request resource in the next closest scheduling request instance before the remote unit 102 receives a HARQ-ACK corresponding to the grant-free transmission; the remote unit is enabled to transmit a scheduling request using a configured scheduling request resource in the next closest scheduling request instance after the remote unit 102 receives a positive acknowledge corresponding to the grant-free transmission; the remote unit 102 is blocked from transmitting a scheduling request using a configured scheduling request resource in the next closest scheduling request instance after the remote unit 102 receives a positive acknowledge corresponding to the grant-free transmission; the remote unit 102 is enabled to transmit a scheduling request using a configured scheduling request resource in the next closest scheduling request instance after the remote unit 102 receives a negative acknowledge corresponding to the grant-free transmission; the remote unit 102 is blocked from transmitting a scheduling request using a configured scheduling request resource in the next closest scheduling request instance after the remote unit receives a negative acknowledge corresponding to the grant-free transmission; the remote unit 102 is blocked from transmitting a scheduling request using a configured scheduling request resource in the next closest scheduling request instance after the remote unit 102 receives an UL grant from the base unit 104; and/or the remote unit is enabled to transmit a scheduling request using a configured scheduling request resource in the next closest scheduling request instance if the remote unit 102 does not receive a HARQ-ACK and does not receive an UL grant from the base unit 104. Moreover, in such embodiments, the remote unit 102 may be configured with dropping criteria. For example, the remote unit 102 may drop the scheduling request and/or the grant-free data transmission unconditionally. As another example, the remote unit 102 may drop may drop the scheduling request and/or the grant-free data transmission due to the use of different waveforms between the scheduling request and the grant-free data transmission.

In some embodiments, scheduling request resources and/or grant-free transmission resources may be mapped to different logical channels. In such embodiments, the different logical channels may have different traffic types. For example, in certain embodiments, 8 logical channels may be used, each of the logical channels may have different traffic types (e.g., different requirements of quality of service, latency, and/or reliability). Accordingly, in such embodiments, 4 of the logical channels may be mapped to 4 different configurations for a scheduling request and the remaining 4 logical channels may be mapped to 4 different configurations for UL transmission without a grant (e.g., grant-free transmission). Whether the remote unit 102 transmits a scheduling request or an UL data transmission without a grant may depend on which logical channel the data in the buffer is from. Moreover, which configuration of scheduling request or UL transmission without a grant to use may depend on which logical channel the data in the buffer is from. As used herein, a "grant-free resource" and a "grant-free transmission resource" may mean substantially the same thing.

Figure 3:
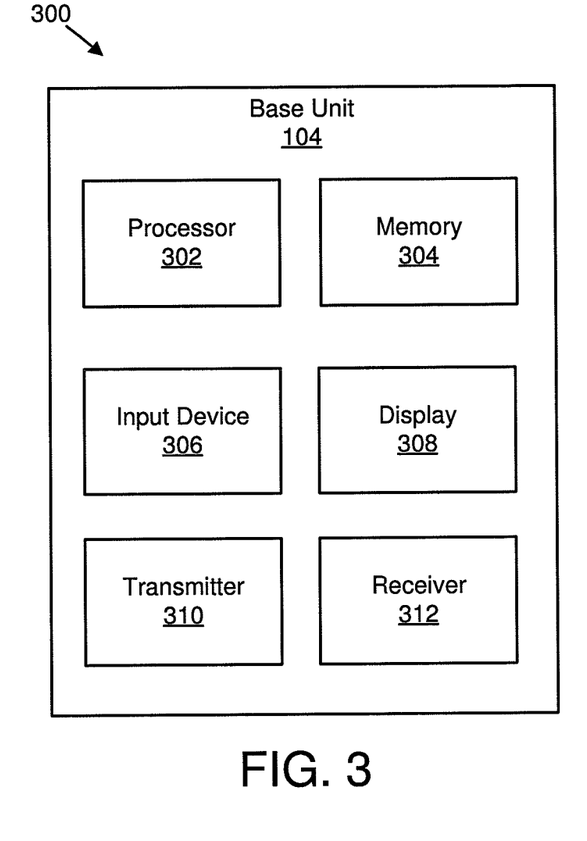
FIG. 3 is a schematic block diagram illustrating one embodiment of an apparatus that may be used for receiving data based on a transmission scheme.

FIG. 3 depicts one embodiment of an apparatus 300 that may be used for receiving data based on a transmission scheme. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive data from a remote unit 102 based on a transmission scheme. In certain embodiments, the receiver 312 may receive a scheduling request on a scheduling request resource and/or data on a grant-free resource. The scheduling request and/or the grant-free resource may be received separately, concurrently, in parallel, sequentially, serially, and/or conditionally. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
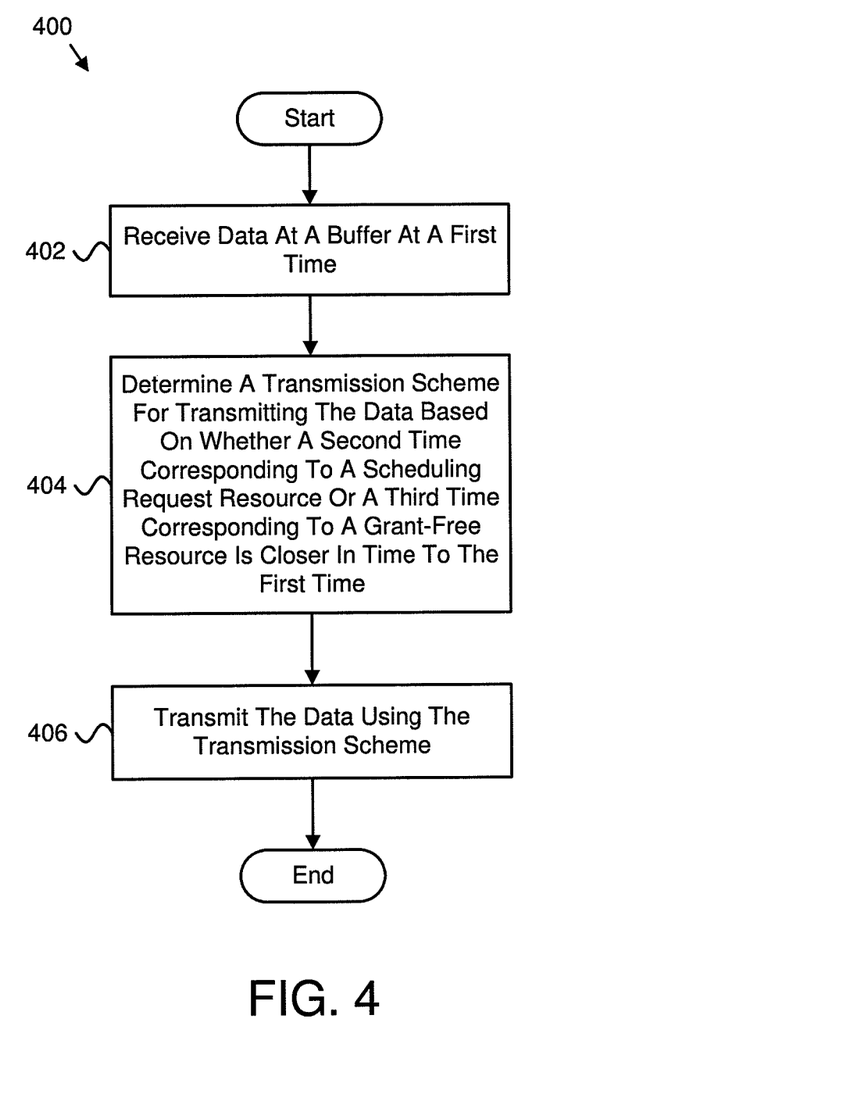
FIG. 4 is a schematic flow chart diagram illustrating one embodiment of a method for determining a transmission scheme.

FIG. 4 is a schematic flow chart diagram illustrating one embodiment of a method 400 for determining a transmission scheme. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 data at a buffer at a first time. In certain embodiments, the method 400 includes determining 404 a transmission scheme for transmitting the data based on whether a second time corresponding to a scheduling request resource or a third time corresponding to a grant-free resource is closer in time to the first time. In some embodiments, the method 400 includes transmitting 406 the data using the transmission scheme.

In one embodiment, the transmission scheme includes transmitting a scheduling request using the scheduling request resource in response to the second time being closer in time to the first time than the third time. In a further embodiment, the transmission scheme includes transmitting at least part of the data using the grant-free resource after transmitting the scheduling request, and the grant-free resource is a next available grant-free resource after the second time and within a timing window for receiving an uplink grant. In certain embodiments, the transmission scheme includes inhibiting transmission of the data (e.g., not transmitting the data) using the grant-free resource after transmitting the scheduling request, and the grant-free resource is a next available grant-free resource after the second time and within a timing window for receiving an uplink grant. In various embodiments, the transmission scheme includes transmitting at least part of the data using the grant-free resource after transmitting the scheduling request, and the grant-free resource is a next available grant-free resource after the second time and outside a timing window for receiving an uplink grant. In some embodiments, the transmission scheme includes inhibiting transmission of the data using the grant-free resource after transmitting the scheduling request in response to receiving an uplink grant before the grant-free resource, and the grant-free resource is a next available grant-free resource after the second time and within a timing window for receiving the uplink grant.

In certain embodiments, the transmission scheme includes inhibiting transmission of the data using the grant-free resource after transmitting the scheduling request in response to receiving an uplink grant before the grant-free resource, and the grant-free resource is a next available grant-free resource after the second time and outside a timing window for receiving the uplink grant. In some embodiments, the transmission scheme includes transmitting at least part of the data using the grant-free resource after transmitting the scheduling request in response to receiving an uplink grant before the grant-free resource and a scheduled transmission corresponding to the uplink grant being after the grant-free resource.

In various embodiments, the transmission scheme includes transmitting at least part of the data using the grant-free request resource in response to the third time being closer in time to the first time than the second time. In certain embodiments, the transmission scheme includes transmitting a scheduling request using the scheduling request resource after transmitting the at least part of the data and in response to the scheduling request resource being before receipt of feedback corresponding to the transmission of the at least part of the data, and the scheduling request resource is a next available scheduling request resource. In some embodiments, the transmission scheme includes inhibiting transmission of a scheduling request using the scheduling request resource after transmitting the at least part of the data and in response to the scheduling request resource being before receipt of feedback corresponding to the transmission of the at least part of the data, and the scheduling request resource is a next available scheduling request resource.

In certain embodiments, the transmission scheme includes transmitting a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource. In various embodiments, the transmission scheme includes inhibiting transmission of a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource. In some embodiments, the transmission scheme includes transmitting a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource.

In various embodiments, the transmission scheme includes inhibiting transmission of a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource. In some embodiments, the transmission scheme includes inhibiting transmission of a scheduling request using the scheduling request resource after transmitting the at least part of the data and in response to receiving an uplink grant, and the scheduling request resource is a next available scheduling request resource. In certain embodiments, the transmission scheme includes transmitting a scheduling request using the scheduling request resource after transmitting the at least part of the data and in response to not receiving feedback and not receiving an uplink grant, and the scheduling request resource is a next available scheduling request resource.

In one embodiment, the transmission scheme includes transmitting a scheduling request using the scheduling request resource and transmitting at least part of the data using the grant-free request resource. In some embodiments, the method 400 mapping scheduling requests and grant-free transmissions to different logical channels with different traffic types.

Figure 5:
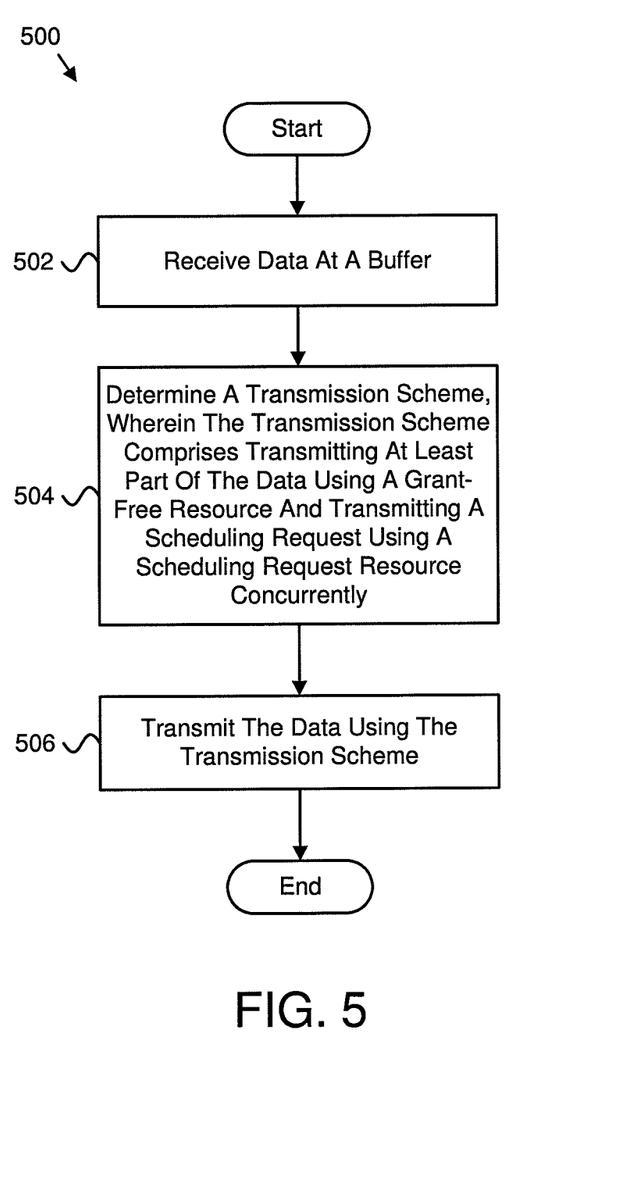
FIG. 5 is a schematic flow chart diagram illustrating another embodiment of a method for determining a transmission scheme.

FIG. 5 is a schematic flow chart diagram illustrating another embodiment of a method 500 for determining a transmission scheme. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 data at a buffer at a first time. In certain embodiments, the method 500 includes determining 504 a transmission scheme, wherein the transmission scheme includes transmitting at least part of the data using a grant-free resource and transmitting a scheduling request using a scheduling request resource concurrently. In some embodiments, the method 500 includes transmitting 506 the data using the transmission scheme.

In one embodiment, the transmission scheme includes transmitting at least part of the data using the grant-free resource after transmitting the scheduling request, and the grant-free resource is a next available grant-free resource within a timing window for receiving an uplink grant. In certain embodiments, the transmission scheme includes inhibiting transmission of the data (e.g., not transmitting the data) using the grant-free resource after transmitting the scheduling request, and the grant-free resource is a next available grant-free resource within a timing window for receiving an uplink grant. In various embodiments, the transmission scheme includes transmitting at least part of the data using the grant-free resource after transmitting the scheduling request, and the grant-free resource is a next available grant-free resource outside a timing window for receiving an uplink grant. In some embodiments, the transmission scheme includes inhibiting transmission of the data using the grant-free resource after transmitting the scheduling request in response to receiving an uplink grant before the grant-free resource, and the grant-free resource is a next available grant-free resource within a timing window for receiving the uplink grant.

In certain embodiments, the transmission scheme includes inhibiting transmission of the data using the grant-free resource after transmitting the scheduling request in response to receiving an uplink grant before the grant-free resource, and the grant-free resource is a next available grant-free resource outside a timing window for receiving the uplink grant. In some embodiments, the transmission scheme includes transmitting at least part of the data using the grant-free resource after transmitting the scheduling request in response to receiving an uplink grant before the grant-free resource and a scheduled transmission corresponding to the uplink grant being after the grant-free resource.

In certain embodiments, the transmission scheme includes transmitting a scheduling request using the scheduling request resource after transmitting the at least part of the data and in response to the scheduling request resource being before receipt of feedback corresponding to the transmission of the at least part of the data, and the scheduling request resource is a next available scheduling request resource. In some embodiments, the transmission scheme includes inhibiting transmission of a scheduling request using the scheduling request resource after transmitting the at least part of the data and in response to the scheduling request resource being before receipt of feedback corresponding to the transmission of the at least part of the data, and the scheduling request resource is a next available scheduling request resource.

In certain embodiments, the transmission scheme includes transmitting a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource. In various embodiments, the transmission scheme includes inhibiting transmission of a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource. In some embodiments, the transmission scheme includes transmitting a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource.

In various embodiments, the transmission scheme includes inhibiting transmission of a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource. In some embodiments, the transmission scheme includes inhibiting transmission of a scheduling request using the scheduling request resource after transmitting the at least part of the data and in response to receiving an uplink grant, and the scheduling request resource is a next available scheduling request resource. In certain embodiments, the transmission scheme includes transmitting a scheduling request using the scheduling request resource after transmitting the at least part of the data and in response to not receiving feedback and not receiving an uplink grant, and the scheduling request resource is a next available scheduling request resource.

In some embodiments, the method 500 mapping scheduling requests and grant-free transmissions to different logical channels with different traffic types.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving data at a buffer at a first time;
   determining a transmission scheme for transmitting the data based on whether a second time corresponding to a scheduling request resource or a third time corresponding to a grant-free resource is closer in time to the first time, wherein:
   in response to the second time corresponding to the scheduling request resource being closer in time to the first time than the third time corresponding to the grant-free resource, the transmission scheme comprises the scheduling request resource; and
   in response to the third time corresponding to the grant-free resource being closer in time to the first time than the second time corresponding to the scheduling request resource, the transmission scheme comprises the grant-free resource; and
   transmitting the data using the transmission scheme.

2. The method of claim 1, wherein the transmission scheme comprises transmitting a scheduling request using the scheduling request resource in response to the second time being closer in time to the first time than the third time.

3. The method of claim 2, wherein the transmission scheme comprises transmitting at least part of the data using the grant-free resource after transmitting the scheduling request, and the grant-free resource is a next available grant-free resource after the second time and within a timing window for receiving an uplink grant.

4. The method of claim 2, wherein the transmission scheme comprises inhibiting transmission of the data using the grant-free resource after transmitting the scheduling request, and the grant-free resource is a next available grant-free resource after the second time and within a timing window for receiving an uplink grant.

5. The method of claim 2, wherein the transmission scheme comprises transmitting at least part of the data using the grant-free resource after transmitting the scheduling request, and the grant-free resource is a next available grant-free resource after the second time and outside a timing window for receiving an uplink grant.

6. The method of claim 2, wherein the transmission scheme comprises inhibiting transmission of the data using the grant-free resource after transmitting the scheduling request in response to receiving an uplink grant before the grant-free resource, and the grant-free resource is a next available grant-free resource after the second time and within a timing window for receiving the uplink grant.

7. The method of claim 2, wherein the transmission scheme comprises inhibiting transmission of the data using the grant-free resource after transmitting the scheduling request in response to receiving an uplink grant before the grant-free resource, and the grant-free resource is a next available grant-free resource after the second time and outside a timing window for receiving the uplink grant.

8. The method of claim 2, wherein the transmission scheme comprises transmitting at least part of the data using the grant-free resource after transmitting the scheduling request in response to receiving an uplink grant before the grant-free resource and a scheduled transmission corresponding to the uplink grant being after the grant-free resource.

9. The method of claim 1, wherein the transmission scheme comprises transmitting at least part of the data using the grant-free request resource in response to the third time being closer in time to the first time than the second time.

10. The method of claim 9, wherein the transmission scheme comprises transmitting a scheduling request using the scheduling request resource after transmitting the at least part of the data and in response to the scheduling request resource being before receipt of feedback corresponding to the transmission of the at least part of the data, and the scheduling request resource is a next available scheduling request resource.

11. The method of claim 9, wherein the transmission scheme comprises inhibiting transmission of a scheduling request using the scheduling request resource after transmitting the at least part of the data and in response to the scheduling request resource being before receipt of feedback corresponding to the transmission of the at least part of the data, and the scheduling request resource is a next available scheduling request resource.

12. The method of claim 9, wherein the transmission scheme comprises transmitting a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource.

13. The method of claim 9, wherein the transmission scheme comprises inhibiting transmission of a scheduling request using the scheduling request resource after transmitting the at least part of the data and in response to the scheduling request resource being after receipt of acknowledgment feedback corresponding to the transmission of the at least part of the data, and the scheduling request resource is a next available scheduling request resource.

14. The method of claim 9, wherein the transmission scheme comprises transmitting a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource.

15. The method of claim 9, wherein the transmission scheme comprises inhibiting transmission of a scheduling request using the scheduling request resource after transmitting the at least part of the data and in response to the scheduling request resource being after receipt of negative acknowledgment feedback corresponding to the transmission of the at least part of the data, and the scheduling request resource is a next available scheduling request resource.

16. The method of claim 9, wherein the transmission scheme comprises inhibiting transmission of a scheduling request using the scheduling request resource after transmitting the at least part of the data and in response to receiving an uplink grant, and the scheduling request resource is a next available scheduling request resource.

17. The method of claim 9, wherein the transmission scheme comprises transmitting a scheduling request using the scheduling request resource after transmitting the at least part of the data and in response to not receiving feedback and not receiving an uplink grant, and the scheduling request resource is a next available scheduling request resource.

18. The method of claim 1, wherein the transmission scheme comprises transmitting a scheduling request using the scheduling request resource and transmitting at least part of the data using the grant-free request resource.

19. The method of claim 1, further comprising mapping scheduling requests and grant-free transmissions to different logical channels with different traffic types.

20. An apparatus comprising:
a memory that receives data at a buffer at a first time;
a processor that determines a transmission scheme for transmitting the data based on whether a second time corresponding to a scheduling request resource or a third time corresponding to a grant-free resource is closer in time to the first time, wherein:
in response to the second time corresponding to the scheduling request resource being closer in time to the first time than the third time corresponding to the grant-free resource, the transmission scheme comprises the scheduling request resource; and
in response to the third time corresponding to the grant-free resource being closer in time to the first time than the second time corresponding to the scheduling request resource, the transmission scheme comprises the grant-free resource; and
a transmitter that transmits the data using the transmission scheme.

\* \* \* \* \*